(12) United States Patent
Wolfgart et al.

(10) Patent No.: US 6,198,639 B1
(45) Date of Patent: Mar. 6, 2001

(54) CIRCUIT CONFIGURATION AND METHOD FOR PRODUCING A CONSTANT OUTPUT VOLTAGE IN CONVERTERS

(75) Inventors: Bernd Wolfgart, Wolfratshausen; Werner Lochter, Moorenweis; Werner Eisert, München; Bostjan Bitenc, Germering, all of (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/581,102

(22) PCT Filed: Dec. 7, 1998

(86) PCT No.: PCT/DE98/03588

§ 371 Date: Jun. 8, 2000

§ 102(e) Date: Jun. 8, 2000

(87) PCT Pub. No.: WO99/33162

PCT Pub. Date: Jul. 1, 1999

(30) Foreign Application Priority Data

Dec. 22, 1997 (DE) ................................. 197 57 364

(51) Int. Cl.[7] .................. H02M 3/335; H02M 7/68; H02M 7/44; H02M 3/24
(52) U.S. Cl. ................. 363/21; 363/97; 323/902
(58) Field of Search .................. 363/20, 21, 95, 363/97, 131; 323/902

(56) References Cited

U.S. PATENT DOCUMENTS

| 4,890,210 | * | 12/1989 | Myers | 363/21 |
| 5,189,599 | * | 2/1993 | Messman | 363/21 |
| 5,276,604 | * | 1/1994 | Messman | 363/65 |
| 5,282,122 | * | 1/1994 | Summer | 363/21 |
| 5,285,366 | | 2/1994 | Zaretsky | 363/56 |
| 5,581,450 | | 12/1996 | Walne | 363/21 |
| 5,600,234 | | 2/1997 | Hastings et al. | 323/282 |
| 5,646,513 | | 7/1997 | Riggio, Jr. | 323/285 |
| 5,731,731 | * | 3/1998 | Wilcox et al. | 327/403 |
| 5,812,383 | * | 9/1998 | Majid et al. | 363/21 |
| 5,995,384 | * | 11/1999 | Majid et al. | 363/21 |

FOREIGN PATENT DOCUMENTS 38 28 816  10/1989  (DE) .............................. H02M/3/156

OTHER PUBLICATIONS

*Patent Abstracts of Japan*: 07 327 362, Dec. 12, 1995, DC Power Supply, Inventor: Tatsumi Naotake.

Reinhard Bloeckl, Schaltnetzteil: Eingangsspannung (fast) egal, Elekronik, Jul. 1991, pp. 122–126.

* cited by examiner

*Primary Examiner*—Peter S. Wong
*Assistant Examiner*—Bao Q. Vu
(74) *Attorney, Agent, or Firm*—Schiff Hardin & Waite

(57) ABSTRACT

To produce a constant voltage at the output of a converter in the form of a step-up converter, current-mode control of the converter is superimposed by voltage-mode control in the range in which the input voltage applied to the inputs of the step-up converter differs slightly from the voltage produced at its outputs.

10 Claims, 3 Drawing Sheets

CIRCUIT CONFIGURATION AND METHOD FOR PRODUCING A CONSTANT OUTPUT VOLTAGE IN CONVERTERS

BACKGROUND OF THE INVENTION

The invention relates to a circuit arrangement for producing a constant voltage in a converter, particularly in the case of a flyback converter operated in a step-up mode. The invention also relates to a method for producing a constant voltage in a converter.

To keep a power that is to be converted and, hence, the thermal loading of the converter at a low level the DC isolation between the primary and the secondary of the transformer in the converter is removed and results in the circuit shown in FIG. 2. This converter produces a differential voltage between an output voltage that is to be achieved, and an input voltage applied to the input of the converter. In this arrangement, the output voltage of the converter is the result of adding the applied input voltage and the voltage produced by the converter. This converter, operated in step-up mode, is called a step-up converter.

To achieve an output voltage of +/−68 V, for example, with an input voltage applied to the input of +/−37 V, for example, the step-up converter needs to introduce a voltage of +/−31 V.

For an input voltage of +/−67 V, for example, the voltage to be readjusted by the step-up converter's converter's is +/−1 V.

However, step-up converters have the disadvantage that the output voltage cannot be kept constant if the voltage difference between the input voltage applied to its input and the output voltage becomes approximately zero.

SUMMARY OF THE INVENTION

An object of the present invention is to specify a circuit arrangement and a method for producing a constant output voltage from a step-up converter.

According to the present invention, this and other objects are achieved by a circuit arrangement for producing a constant voltage in a converter including an input circuit, the input circuit being connected to an input voltage. In addition, a switching transistor is located within the input circuit. A drive unit is included for producing a drive signal for the switching transistor and a current transformer unit located within the input circuit produces a first control signal with the current transformer unit being connected to a first input of the drive unit. The circuit arrangement further includes an output circuit and a smoothing unit terminating the output circuit with at least one connection of an output of the smoothing unit connected to a first connection of an output of the circuit arrangement. A control unit is disposed between the first connection and the second connection with the output of the circuit arrangement for producing a second control signal that is connected to a second input of the drive unit. Finally, a control signal production unit is disposed between the first input of the drive unit and an output of the current transformer unit for outputting the first control signal with the control signal production unit producing a third control signal that is formed based on a voltage-mode control and is superimposed on the first control signal.

Another aspect of the present invention includes a method for producing a constant voltage having the steps of connecting an input voltage to an input circuit of a converter, producing a first control signal using a current transformer unit disposed in the input circuit of the converter, applying the first control signal to a first input of a drive unit, generating the drive signal and the drive unit for a switching transistor disposed in the input circuit of the converter in response to the first control signal, providing a smoothing unit in an output circuit of the converter with at least one output of the smoothing unit being connected to an output of the converter, connecting a control unit between outputs of the converter with the control unit producing a second control signal, applying the second control signal to a second input of the drive unit, generating a third control signal using a voltage mode control and superimposing the third control signal on the first control signal.

The present invention affords the advantage that no low-frequency voltage fluctuations in the output voltage of the step-up converter occur with small voltage differences between the output voltage that is to be achieved and the predetermined input voltage.

The present invention affords the further advantage that an additional drive voltage for the converter's switching transistor is used such that a ramp-shaped form of the converter's drive voltage brings the converter into operation at reduced speed in line with its drive voltage when a high input voltage is applied to the input.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference designations represent like elements throughout and wherein.

DETAILED DESCRIPTION OF THE PREFERRED EMBODIMENTS

Figure 1:
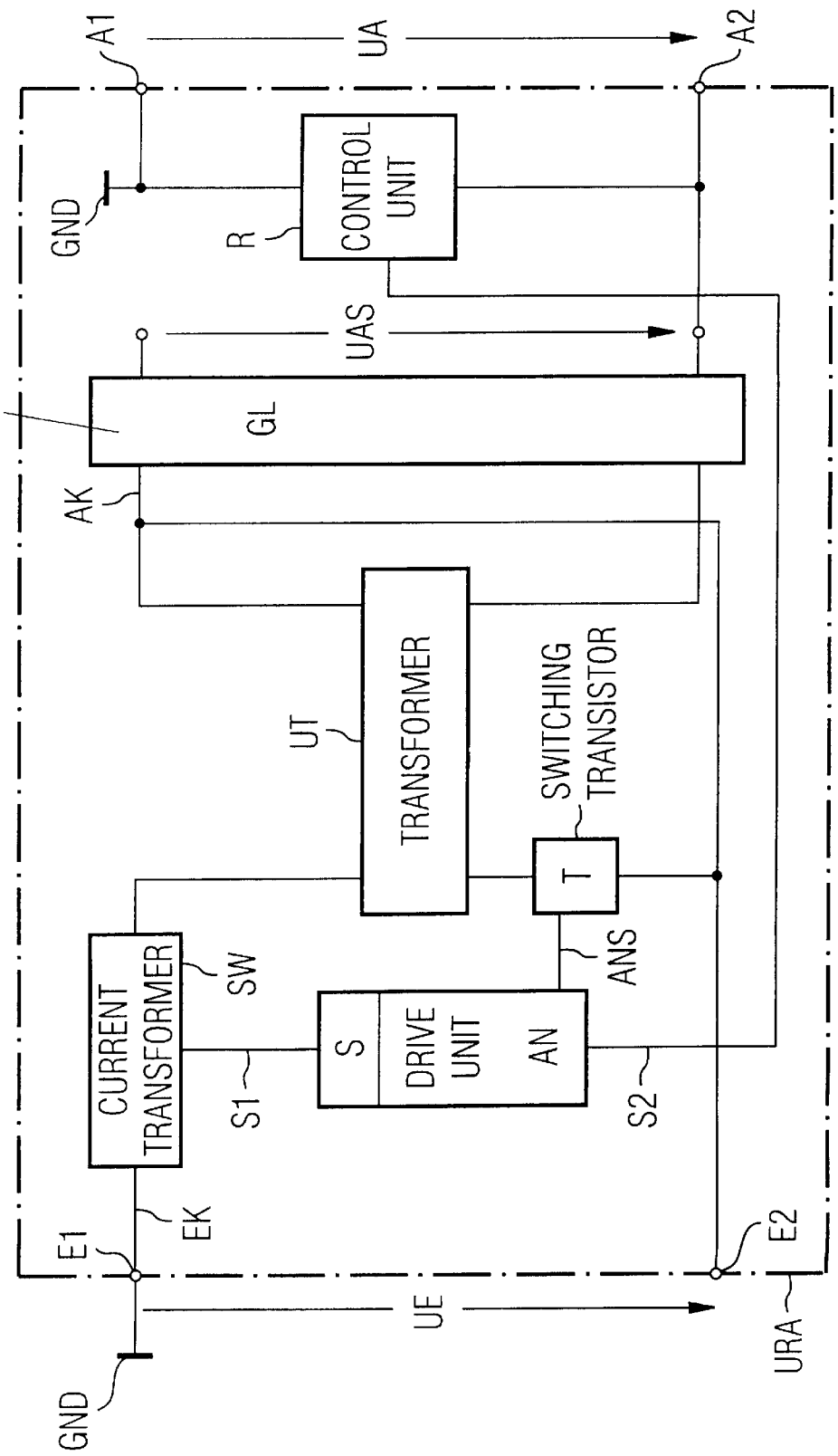
FIG. 1 shows a block diagram of a step-up converter.

FIG. 1 shows a block diagram of a step-up converter URA. This step-up converter URA is essentially formed from an input circuit EK and output circuit AK formed by a transformer UT. The input circuit EK contains a current transformer unit SW and a switching transistor T. The output circuit AK is terminated by a smoothing unit GL. The drive unit AN, which, by way of example, outputs a pulse-width-modulated drive signal ANS for controlling the switching transistor T, is controlled by a first control signal S1 produced by the current transformer unit SW and by a second control signal S2, which is output by a control unit R arranged at the output of the step-up converter URA. The output voltage produced at the output of the step-up converter URA is the result of the sum of the input voltage UE and the second voltage UAS, which is produced at the output of the smoothing unit GL.

Figure 2:
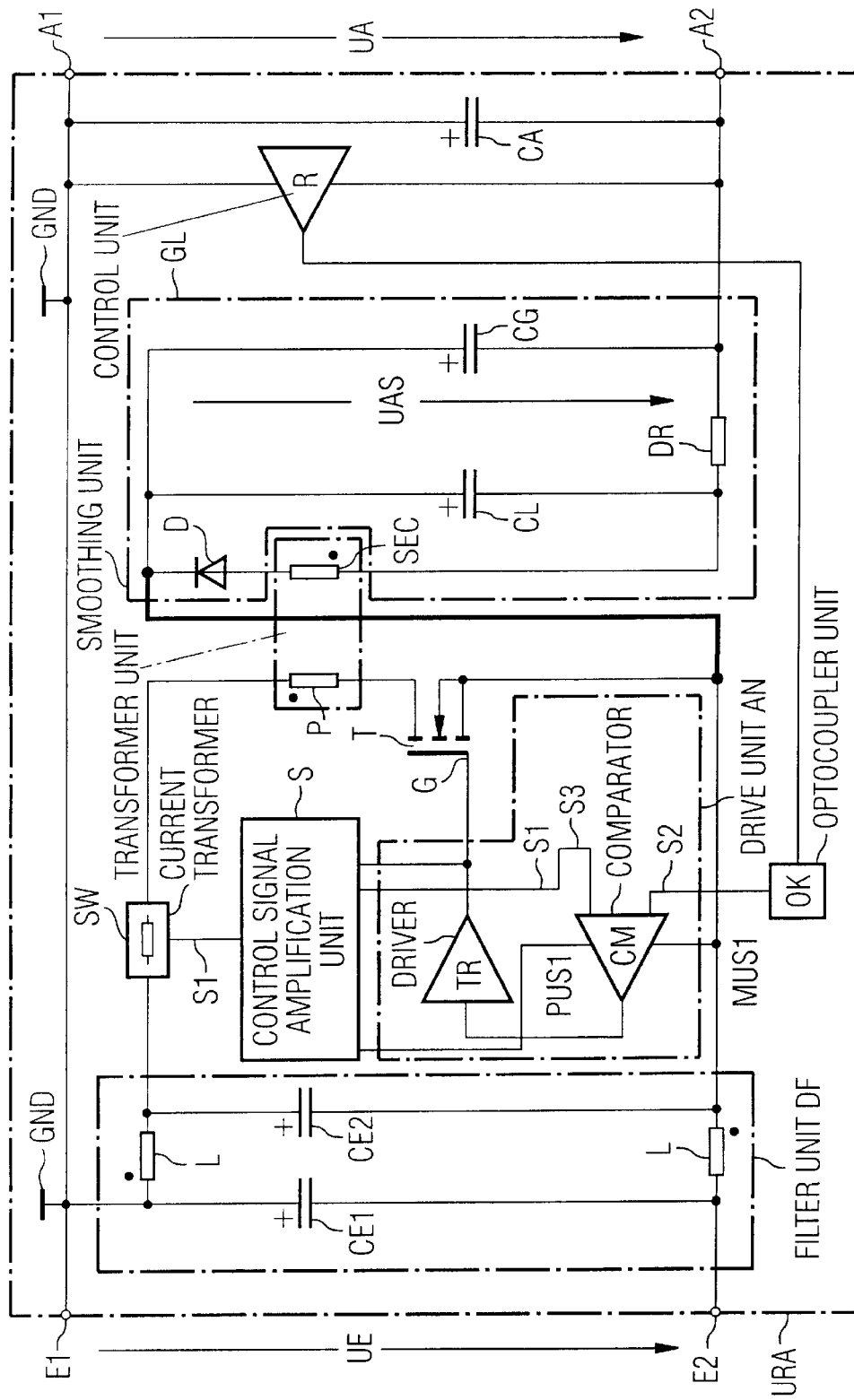
FIG. 2 shows a refinement of the step-up converter.
Figure 3:
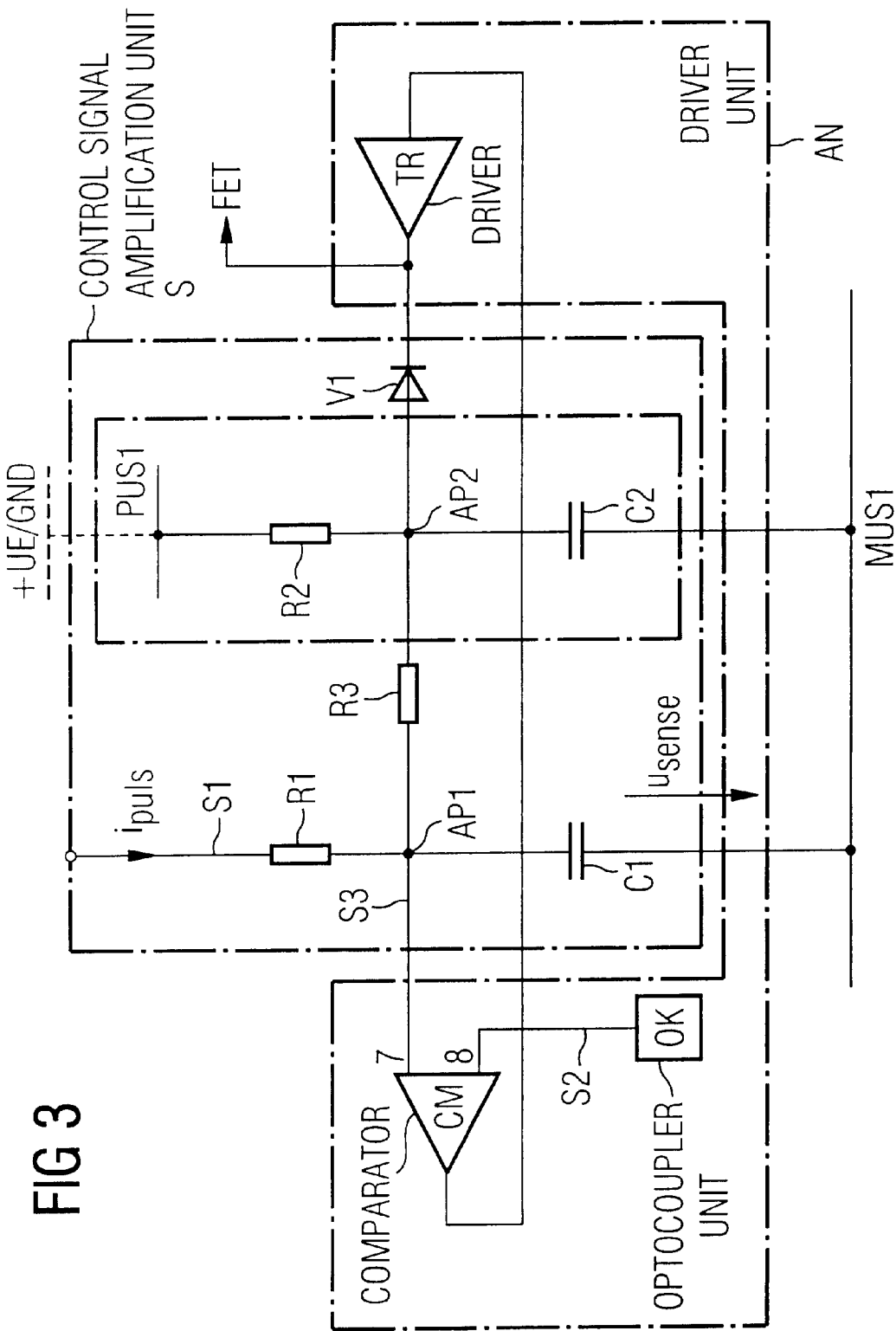
FIG. 3 shows the refinement of a drive element according to the present invention.

FIG. 2 shows a refinement of the step-up converter URA. The essential units are a filter unit DF, the current transformer unit SW, the drive unit AN, the switching transistor T, the transformer UT, a rectifier diode D, a charging capacitor CL, a series circuit comprised of a smoothing capacitor CG and an inductance DR that is arranged in parallel with the charging capacitor CL, and the control unit R, which is connected in parallel with an output capacitor CA and is connected to the drive unit AN via an optocoupler unit OK. Arranged between the inputs E1, E2 of the step-up converter URA, to which the input voltage UE is applied, is the filter unit DF. Arranged between the filter unit DF and the transformer UT is the switching transistor T. The control electrode G of the switching transistor T is connected to an output of the drive unit AN. The current transformer unit SW is provided between the filter unit DF and the transformer UT. Arranged in series with the secondary SEL of the transformer UT is the rectifier diode D. Arranged in parallel with this is the charging capacitor CL. A series circuit comprising a smoothing capacitor CG and an inductor DR is annexed in parallel with the charging capacitor CL for the purpose of smoothing the pulsed voltage across the charging capacitor CL.

The filter unit DF is designed such that it comprises a first capacitor CE1 arranged between the input-side connections E1, E2 of the step-up converter URA and a second capacitor CE2 arranged in parallel with the capacitor CE1. Further a series inductance L is arranged in each main current path between the first capacitor CE1 and the second capacitor CF2. This filter unit DF is used to filter out interference voltages, (e.g., voltages caused by the pulsed application of the input voltage UE to the primary P of the transformer UT), thus preventing an interfering reaction on a voltage source providing the input voltage UE.

The drive unit AN essentially comprises a driver TR and a comparator CM. An output of the comparator CM is connected to an input of the driver TR. An output of the driver TR is connected to the control input G of the switching transistor T, which is a field-effect transistor in the present embodiment. Inserted between the control input G of the switching transistor T and a first input of the comparator CM is a control signal amplification unit S. A second input of the comparator CM is connected via an optocoupler OK to the control unit R arranged on the output side. This optocoupler OK isolates potentials, between a potential of the step-up converter URA, equivalent to ground potential GND, and a reference-ground potential of the drive unit AN.

In the control signal amplification unit S, the first control signal S1 formed for current-mode control is superimposed with a third control signal S3 formed for voltage-mode control.

As shown in FIG. 2, the control signal amplification unit S is formed from first and second RC elements R1, C1 and R2, C2, respectively. The first RC element R1, C1, formed from a first resistor R1 and a first capacitor C1, and the second RC element R2, C2, formed from a second resistor R2 and a second capacitor C2, are connected by a third resistor R3 via the tap points AP1, AP2, which are each located between said components. A first connection of the third resistor R3 is connected to a first input of the comparator CM and a second connection of the third resistor R3 is connected to the control input G of the switching transistor T via a decoupling diode V1. A first lead of the first resistor R1 is connected to the output of the current transformer unit SW, which outputs the first control signal S1. A first lead of the second resistor R2 can be connected either to an auxiliary voltage PUS1 or to the ground potential GND of the step-up converter URA. Electrodes of the first and second capacitors C1 and C2 are connected to the voltage potential MUS1, which is predetermined by the input voltage UE. The first RC element R1, C1 is used to filter out voltage spikes from the ramp-shaped control signal S1. The first control signal S1 is present on the first lead of the first resistor R1. A third control signal S3, formed by the second RC element R2, C2, is applied to the first input of the comparator CM via the third resistor R3. The second capacitor C2 of the second RC element R2, C2 carries a linearly rising voltage profile for the time domain of a conceivable turned-on duration for driving the switching transistor T. The time constant of the second RC element R2, C2 can be set by selection of the second resistor R2 and/or the capacitor C2. The second capacitor C2 of the second RC element R2, C2 is charged and discharged synchronously with the driver TR being turned on and turned off. The third resistor R3 is used to superimpose the voltage across the second capacitor C2 on the voltage across the first RC element R1, C1. By contrast with the switching transistor T being controlled by the ramp-shaped voltage profile of the first control signal S1, this type of voltage addition affords the advantage that, with an output voltage UA which is only slightly above that of the input voltage UE, no pulse dropouts and no instabilities or no low-frequency voltage fluctuations occur in the case of the output voltage UA, which can be tapped off at the output of the step-up converter.

A further advantage of the specified circuit arrangement of the step-up converter URA can be attained by tying the second resistor R2 of the second RC element R2, C2 to an operating potential that is equivalent to ground potential GND. This measure produces a ramp-shaped voltage profile in the wide range of the input voltage UE applied to the input. The voltage gradient, predetermined by the second RC element R2, C2, of the charging curve for the second capacitor C2 is used such that, if there is an abrupt rise in the input voltage UE, the first control signal S1 is filtered from voltage spikes by the first RC element, and the step-up converter URA is then started up at reduced speed. The advantage resulting from the additional sawtooth-shaped voltage profile produced across the second RC element R2, C2 is that, with a relatively steep gradient of the leading edge of the sawtooth-shaped drive voltage, no pulse dropouts occur when the switching transistor is driven and a constant output voltage is thus achieved, particularly in the transition region mentioned at the outset.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A circuit arrangement for producing a constant voltage in a converter comprising:
    an input circuit, said input circuit being connected to an input voltage;
    a switching transistor located within the input circuit;
    a drive unit for producing a drive signal for the switching transistor;
    a current transformer unit located within the input circuit for producing a first control signal, said current transformer unit being connected to a first input of the drive unit;
    an output circuit;
    a smoothing unit terminating the output circuit, at least one connection of an output of the smoothing unit being connected to a first connection of an output of the circuit arrangement;
    a control unit disposed between the first connection and a second connection of the output of the circuit arrangement for producing a second control signal that is connected to a second input of the drive unit; and a control signal production unit disposed between the first input of the drive unit and an output of the current transformer unit that outputs the first control signal, the control signal production unit producing a third control signal that is formed based on a voltage-mode control and is superimposed on the first control signal.

2. The circuit arrangement as claimed in claim 1, wherein the control signal production unit contains a first RC element comprised of a first resistor and a first capacitor for smoothing the first control signal having a ramp-shaped profile, the output of the current transformer unit being connected to the first resistor and to a first tap point that is disposed between the first resistor and the first capacitor the first tap point connected to the first input of the drive unit.

3. The circuit arrangement as claimed in claim 1, wherein the control signal production unit includes a second RC element comprised of a second resistor and a second capacitor for producing the third control signal, the second RC element being connected to the first input of the drive unit via a second tap point that is disposed between the second resistor and the second capacitor, and the second resistor being connected to an auxiliary potential.

4. The circuit arrangement as claimed in claim 3, wherein the second resistor is connected to the input voltage.

5. The circuit arrangement as claimed in claim 1, wherein the drive unit is comprised of a comparator and a driver, a first input of the comparator being connected to the first input of the drive unit and a second input of the comparator being connected to the second input of the drive unit, and an output of the comparator being connected to a control input of the switching transistor via the driver.

6. The circuit arrangement as claimed in claim 1, wherein the second input of the drive unit is connected to an output of the control unit via an optocoupler unit to receive the second control signal.

7. The circuit arrangement as claimed in claim 3, wherein the second tap point is connected to a control input of the switching element via a decoupling diode.

8. The circuit arrangement as claimed in claim 1, wherein the input voltage applied to the input circuit is added to voltage produced on the output circuit due to a lack of DC isolation between the input circuit and the output circuit.

9. A method for producing a constant voltage comprising the steps of:

connecting an input voltage to an input circuit of a converter;

producing a first control signal using a current transformer unit disposed in the input circuit of the converter;

applying the first control signal to a first input of a drive unit;

generating a drive signal in the drive unit for a switching transistor disposed in the input circuit of the converter in response to the first control signal;

providing a smoothing unit in an output circuit of the converter, at least one output of the smoothing unit being connected to an output of the converter;

connecting a control unit between outputs of the converter, the control unit producing a second control signal;

applying the second control signal to a second input of the drive unit;

generating a third control signal using a voltage-mode control; and superimposing the third control signal on the first control signal.

10. The method as claimed in claim 9, wherein the first and third control signals have a ramp shape.

* * * * *